(12) United States Patent
Filippi et al.

(10) Patent No.: US 12,716,990 B2
(45) Date of Patent: Aug. 25, 2026

(54) RADAR SIGNAL TRANSMIT POWER SHAPING AND PROCESSING

(71) Applicant: NXP B.V., Eindhoven (NL)

(72) Inventors: Alessio Filippi, Eindhoven (NL); Erwin Janssen, Veldhoven (NL); Arie Geert Cornelis Koppelaar, Giessen (NL)

(73) Assignee: NXP B.V., Eindhoven (NL)

( * ) Notice: Subject to any disclaimer, the term of this patent is extended or adjusted under 35 U.S.C. 154(b) by 259 days.

(21) Appl. No.: 18/535,043

(22) Filed: Dec. 11, 2023

(65) Prior Publication Data

US 2025/0189626 A1 Jun. 12, 2025

(51) Int. Cl.

| | |
|---|---|
| ***G01S 7/295*** | (2006.01) |
| ***G01S 7/282*** | (2006.01) |
| ***G01S 7/35*** | (2006.01) |

(52) U.S. Cl.

CPC .............. *G01S 7/295* (2013.01); *G01S 7/282* (2013.01); *G01S 7/356* (2021.05)

(58) Field of Classification Search

None

See application file for complete search history.

(56) References Cited

U.S. PATENT DOCUMENTS

2018/0372530 A1 12/2018 Welle et al.

FOREIGN PATENT DOCUMENTS

EP 4498112 A1 1/2025

OTHER PUBLICATIONS

Engels, F. et al., "Automotive Radar Signal Processing: Research Directions and Practical Challenges," IEEE Journal of Selected Topics in Signal Processing, vol. 15, No. 4, pp. 865-878, Jun. 2021, doi: 10.1109/JSTSP.2021.3063666.

*Primary Examiner* — Whitney Moore

(57) ABSTRACT

A radar device includes a radar front end and a radar processor. The radar front end includes transmit signal generation circuitry to generate a radar transmit signal sequence including a plurality of radar transmit signals and a power shaping component configured to receive the plurality of radar transmit signals and output the plurality of radar transmit signals with a plurality of different power levels. The radar front end includes a transmitter to transmit the plurality of radar transmit signals based on the plurality of different power levels, where the plurality of different power levels is based on a power profile associated with a window applied to digitized samples of reflections of the transmitted plurality of radar transmit signals. The radar processor is configured to apply the window across a slow-time of the digitized samples of the reflections prior to velocity processing.

19 Claims, 5 Drawing Sheets

RADAR SIGNAL TRANSMIT POWER SHAPING AND PROCESSING

BACKGROUND

Many systems rely on radar to provide accurate information of the surrounding environment. For example, modern vehicles employ radar to implement Advanced Driving Assistance Systems (ADAS) and Autonomous Driving (AD) that perform functions such as adaptive cruise control, automated steering, and emergency braking. In some cases, vehicular radar systems use radar modulation schemes (e.g., Frequency Modulated Continuous Waveform (FMCW) radar) that modulate the frequency of a radar signal in sequences commonly referred to as radar chirps, or chirps for short, in the 76 Gigahertz (GHz) to 81 GHz frequency band. Radar systems using these types of radar modulation schemes sense the surrounding environment by transmitting the sequence of radar chirps, receiving reflections of the radar chirps after they reflect off of one or more objects, and processing the received reflections to obtain a range profile of the one or more objects as well as the velocities of the objects. In order to provide a more robust and accurate perception of the surrounding environment, radar systems implement various radar transmission and signal processing methods.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
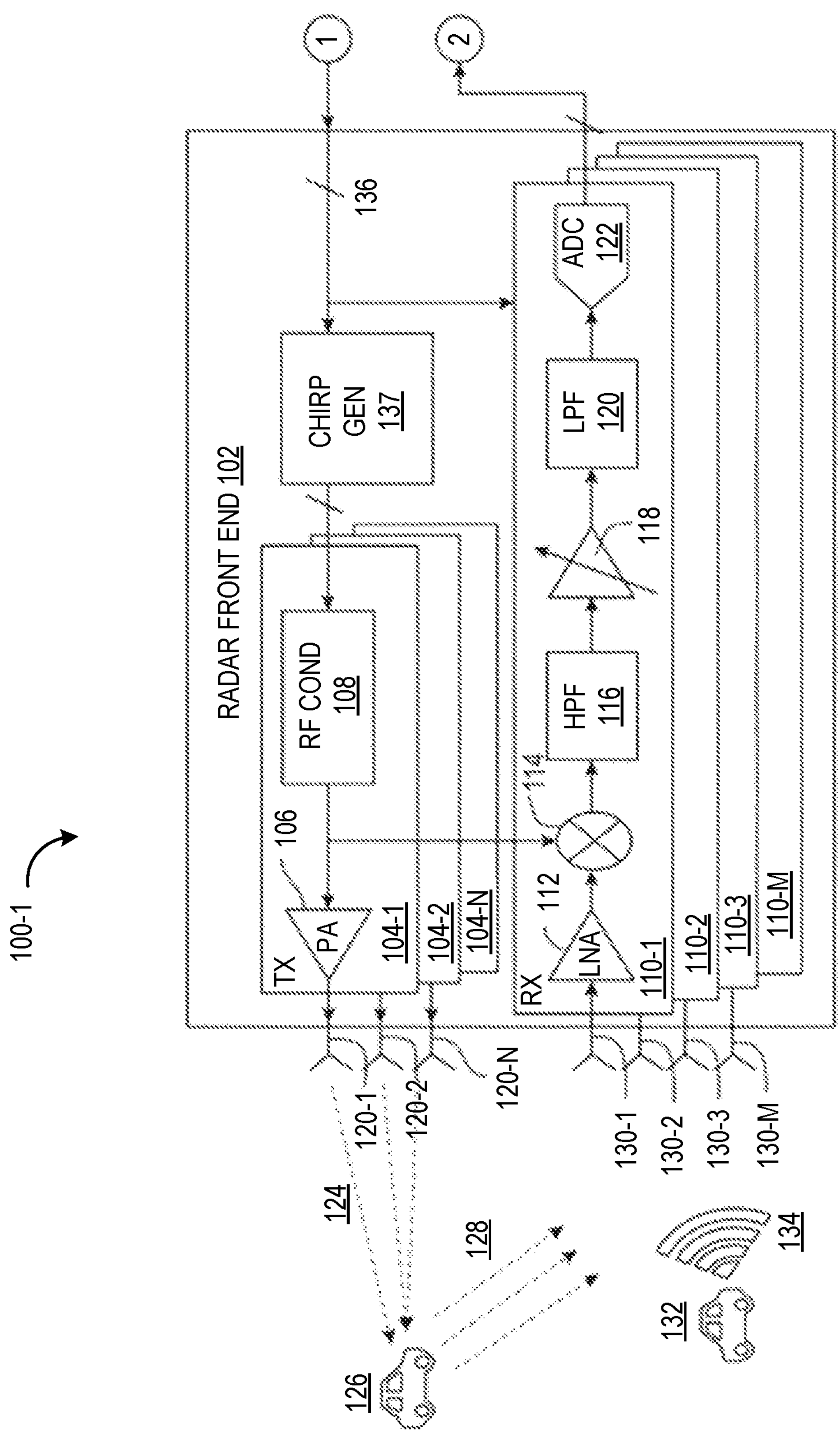
FIGS. 1 and 2 show examples of a radar front end and a radar master controller processing unit, respectively, in a radar system configured to implement transmit power shaping and corresponding signal processing techniques in accordance with various embodiments.

Some of the challenges in designing high performance radar systems include limiting the power required to transmit a robust radar signal and improving the signal quality of the received radar signal. For instance, radar systems relying on high transmit power levels may be unsuitable due to increased hardware complexity and hardware costs in addition to higher power consumption, and radar systems that are more susceptible to noise or interference may not be able to provide information about the surrounding environment in an accurate and timely manner. Additionally, according to conventional methods, reducing the power of the transmitted radar signal typically degrades the signal quality (e.g., the signal-to-noise ratio, SNR) of the received radar signal and attempts to improve the signal quality of the received radar signal often requires increasing the transmission power. FIGS. 1-6 provide transmit power shaping and signal processing techniques to improve the signal quality at the receiver without requiring increases in the transmission power budget (that is, the transmission power utilized over a period of time). Alternatively, these techniques can be used to reduce the transmission power budget while maintaining a relatively high signal quality at the receiver.

To illustrate, in some embodiments, a radar system senses the surrounding environment by transmitting a sequence of chirps and receiving reflections of the chirps after they bounce off of one or more objects (also referred to as targets) in the surrounding environment. After converting the received reflections to digitized samples, the radar system processes the digitized samples to obtain an estimate of the range profile which includes distances to the one or more targets. This range processing step is sometimes referred to as fast-time range processing and involves applying a first window (e.g., multiplying by a first window function) in the fast-time of the digitized samples and then applying a first fast Fourier transform (FFT) to the windowed samples in the fast-time to generate a series of range profiles. The range profiles generated by fast-time range processing are then processed at a velocity (or Doppler) processing step that is referred to herein as slow-time velocity (or Doppler) processing. Slow-time velocity processing involves applying a second window (e.g., a Gaussian window, a Chebyshev window, Hann and Hamming windows, a Blackman window, or the like) in the slow-time of the digitized samples. Applying the second window involves multiplying the digitized samples by a second window function that includes a plurality of weighted coefficients that are zero-valued outside a selected interval in the slow-time domain. This is followed by applying a second FFT in the slow-time to estimate the phase evolution of the different targets over time. The second window equally weighs the samples of a single range profile, and therefore, the second window can be performed at the individual chirp level (i.e., per chirp of the plurality of chirps in the sequence of chirps). The present disclosure leverages this characteristic and moves a portion of the weighted coefficients of the second window (e.g., the square root of the second window function) from the signal processor to the transmitter of the radar system. That is, as opposed to conventional methods that apply the entire second window solely at the signal processing side prior to slow-time velocity processing, the techniques described herein split the second window into two parts. The first of these two parts is applied at the transmitter prior to transmitting the sequence of chirps and the second of these two parts is applied prior to slow-time velocity processing (i.e., the second part is retained at its original position). Shifting a part of the second window to the transmitter side modifies the power envelope of the sequence of chirps that are transmitted by the radar system from having a constant power level to having a number of different power levels. As such, and differing from conventional methods that transmit the sequence of radar chirps at a constant power level, the techniques described herein transmit the sequence of radar chirps at different power levels that correspond to a part of the processing imparted by the weighted coefficients of the second window being moved from the radar signal processor to the transmitter. Thus, the techniques described herein reduce the transmit power of the chirps that correspond to the samples whose values will be mitigated by the second window during signal processing. In this manner, the transmit power shaping and second window techniques described herein change how the noise and the signal are impacted by the second window applied during signal processing by reducing the transmit signal power for the samples that will be more affected (e.g., minimized or zeroed) by the second window. Therefore, a greater portion of the power budget to transmit the sequence of chirps in the radar signal can be allocated to the chirps associated with samples that occur during the focused interval of the second window. This results in an SNR gain if the total transmission power budget is kept the same (i.e., the average transmission power of the radar chirps is the same). Alternatively, this approach reduces the transmission power budget used to transmit the radar chirps if the SNR at the receiver is maintained at the same or similar level as the power budget that supports executing the second window entirely during signal processing of the received signal.

In some embodiments, any of the elements, components, or blocks shown in the ensuing figures are implemented as one of software executing on a processor, hardware that is hard-wired (e.g., circuitry) to perform the various operations described herein, or a combination thereof. For example, one or more of the described blocks or components (e.g., blocks or components associated with shaping the power profile of a radar signal for transmission, blocks or components associated with applying windows to digitized samples prior to FFT processing, blocks or components associated with fast-time or slow-time FFT processing, or the like) represent software instructions that are executed by hardware such as a digital signal processor, an application-specific integrated circuit (ASIC), a set of logic gates, a field programmable gate array (FPGA), programmable logic device (PLD), a hardware accelerator, a parallel processor, or any other type of hardcoded or programmable circuit. As another example, one or more of the described blocks or components (e.g., blocks or components associated with shaping the power profile of a radar signal for transmission, or the like) represent hardware such as a multi-level power amplifier.

Figure 2:
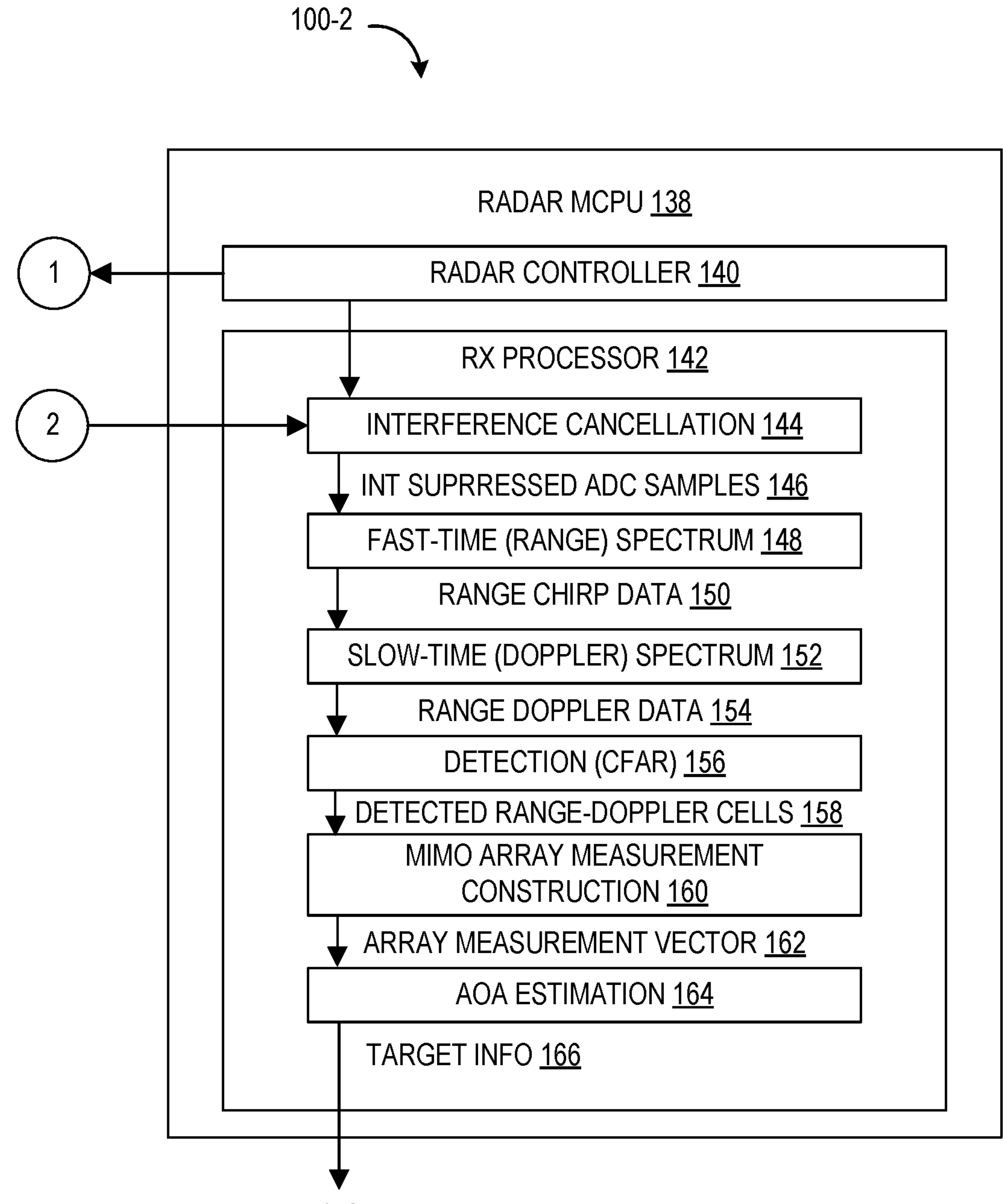

FIGS. 1 and 2 show an example of a radar system 100 (including a first radar system portion 100-1 of FIG. 1 and a second radar system portion 100-2 of FIG. 2) that implements power shaping of a transmit radar signal based on a second window applied prior to slow-time velocity processing at the radar processor in accordance with various embodiments. FIG. 1 shows a radar front end 102 of the radar system 100 and FIG. 2 shows a radar master controller processing unit (MCPU) 138 of the radar system 100.

Referring to FIG. 1, in some embodiments, the radar front end 102 includes multiple transmitters 104-1 to 104-N (collectively referred to as transmitters 104). In some embodiments, each transmitter 104 includes a power amplifier (PA) 106 and a radio frequency (RF) conditioning (cond.) component 108. The PA 106 converts a lower power RF signal into a higher power RF signal prior to transmission. For example, in some embodiments, the PA 106 is configured to convert a lower power RF signal including a plurality of chirps into a higher power RF signal. In some cases, as described herein, the higher power RF signal includes multiple different power levels. For example, the PA 106 can be an N-stage PA that is configured, based on an input voltage control signal, to output the higher power RF signal at N different stages, where N is an integer greater than one. In some embodiments, the PA 106 is a three-stage PA that is configured to receive a lower power RF signal from the RF Cond 108 and output a higher power RF signal at three different higher power levels. The RF conditioning component 108 includes hardware and/or software for modifying (i.e., conditioning) the signal received from the chirp generator 137 prior to providing it to the PA 106. For example, in some embodiments, the RF conditioning component 108 includes one or more filters that filter the RF signals prior to signal power amplification at PA 106.

In some embodiments, the radar front end 102 receives program, control trigger, and reference clock signals 136 that are utilized for chirp generation at a chirp generator 137 or received signal processing in the receivers 110. For example, the reference clock signal is a local oscillator (LO) signal and the control trigger is a chirp start trigger signal that are input to the chirp generator 137 to generate radar chirp sequences that are further processed (e.g., by RF conditioning component 108 and PA 106) before being transmitted by the transmit antennas 120 of the radar front end 102. The chirp generator 137 includes a phase locked loop (PLL) that generates linear frequency modulated chirp sequences. For example, the PLL in the chirp generator 137 generates an FMCW chirp sequence for transmission by the transmitters 104. In the illustrated embodiment, the transmit signal generation component is a chirp generator 137. In other embodiments, the transmit signal generation component is a pulse generator or a digital radar modulation component. Thus, while the following embodiments describe transmit power shaping and signal processing techniques with respect to chirp-based radar waveforms, in other embodiments, the transmit power shaping and signal processing techniques can also be applied to pulse-based and digitally modulated radar waveforms as well.

The radar front end 102 also includes transmission antennas 120. In some embodiments, each transmitter 104 is configured with its own transmission antenna 120 (i.e., transmitter 104-1 with transmission antenna 120-1, transmitter 104-2 with transmission antenna 120-2, transmitter 104-3 with transmission antenna 120-3, and transmitter 104-N with transmission antenna 120-N). Transmitters 104 send transmitted signals 124 toward one or more targets 126 (one shown for clarity). The transmitted signals are reflected from the target 126, and the target reflected signals 128 (collectively referred to as target radar signal) are directed back to the radar system 100. The target reflected signals 128 are received by reception antennas 130-1 to 130-M. In some embodiments, each receiver 110 is configured with its own reception antenna 130 (i.e., receiver 110-1 with reception antenna 130-1, receiver 110-2 with reception antenna 130-2, receiver 110-3 with reception antenna 130-3, receiver 110-M with reception antenna 130-M). Along with receiving the target reflect signals 128, the receivers 110 receive other unwanted signals. For example, an interferer 132 (in this example, radar signals from another vehicle) transmits interference 134 which is also received by the receivers 110.

In some embodiments, the radar front end 102 also includes multiple receivers 110-1 to 110-M (collectively referred to as receivers 110). One or more of the receivers 110 includes a low noise amplifier (LNA) 112, a deramp mixer 114, a high pass filter (HPF) 116, a power amplifier 118, a low pass filter (LPF) 120, and an analog-to-digital converter (ADC) 122 that digitizes the received radar signal prior to providing it to a radar signal processor for estimating a range and velocity of the targets 126.

Referring now to FIG. 2, in some embodiments, the radar system 100 includes a radar master controller processing unit (MCPU) 138. In some embodiments, the radar MCPU 138 includes a radar controller 140 and a receiver (RX) processor 142. The radar controller 140 provides the program, control trigger, and reference clock signals 136 as described above. The receiver processor 140 receives the digitized signals from the radar front end 102, e.g., from the ADCs 122 of the receivers 110. In some embodiments, the RX processor 140 includes an interference cancellation component 144, which provides the interference suppressed ADC samples 146. A fast-time (Range) spectrum component 148 receives and processes the interference suppressed ADC samples 146. For example, the fast-time spectrum component 148 applies a first window in the fast-time to the interference suppressed ADC samples 146 and then applies an FFT over the fast-time of the windowed samples. In this manner, the fast-time spectrum component 148 provides a range chirp data 150 indicative of chirp reflections received at the reception antennas 130. In some embodiments, the range chirp data 150 is cubed with an x-axis and a y-axis made up of fast time data and a z-axis representing data for each of the reception antennas 130. The range chirp data 150 is received and processed by a slow-time (velocity, or Doppler) spectrum component 152. For example, the slow-time spectrum component 152 applies a second window in the slow-time to the range chirp data 150 and then applies an FFT over the slow-time of the windowed samples. In this manner, the slow time spectrum component 152 provides range-Doppler data 154 that is cubed with x-axis and y-axis made up of slow time data and a z-axis representing data for each of the reception antennas 130. In some embodiments, the range Doppler data 154 is received and processed by a constant false alarm rate (CFAR) detection component 156. The detection component 156 provides detected range and Doppler cell data 158. A multiple-input multiple-output (MIMO) array measurement construction component 160 receives and processes the detected range and Doppler cell data 158. The MIMO array measurement construction component 160 provides an array measurement vector 162. The array measurement vector is received and processed by a target Angle of Arrival (AoA) estimation component 164. The target AoA estimation component 164 provides target information 166 attributed to the target 126 detected by radar system 100 to other components via data interface 170. For example, the other components include software modules executed by a processor to implement advanced driver assistant system (ADAS) or autonomous driving (AD) perception and vehicular control systems.

In some embodiments, the radar system 100, including the radar front end 102 and the radar MCPU 138, is configured to perform the transmit RF signal power shaping and the signal processing techniques described herein. For example, one or more of the transmitters 110 are configured to generate a plurality of radar chirps according to a power profile with varying power levels for transmission. The power profile, in some embodiments, is determined based on the window applied over the slow-time prior to slow-time FFT processing (e.g., by the slow-time spectrum component 152). Therefore, in some embodiments, the transmitters 110 are equipped with a multi-stage power amplifier, such as PA 106, that received a lower power RF signal at its input and outputs a higher power RF signal at multiple discrete power levels for transmission as radar signal 124. The radar front end 102 also receives the reflected radar signal 128 after it bounces off a target 126 and digitizes the received radar signal, which includes reflections of the transmitted radar chirps, for further processing at the radar MCPU 138. The radar MCPU 138 includes software and/or hardware to perform signal processing on the digitized signal received from the radar front end 102. For example, the slow-time spectrum component 152 is configured to apply a portion of the second window applied over the slow-time of the digitized samples as compared to the second window applied in conventional radar signal processing methods. In some cases, the slow-time spectrum component 152 applies half of the second window over the slow-time over the digitized samples, where the effect of the other half of the second window is applied at the transmitter 110 by modifying the power levels of the chirps prior to transmission.

Figure 3:
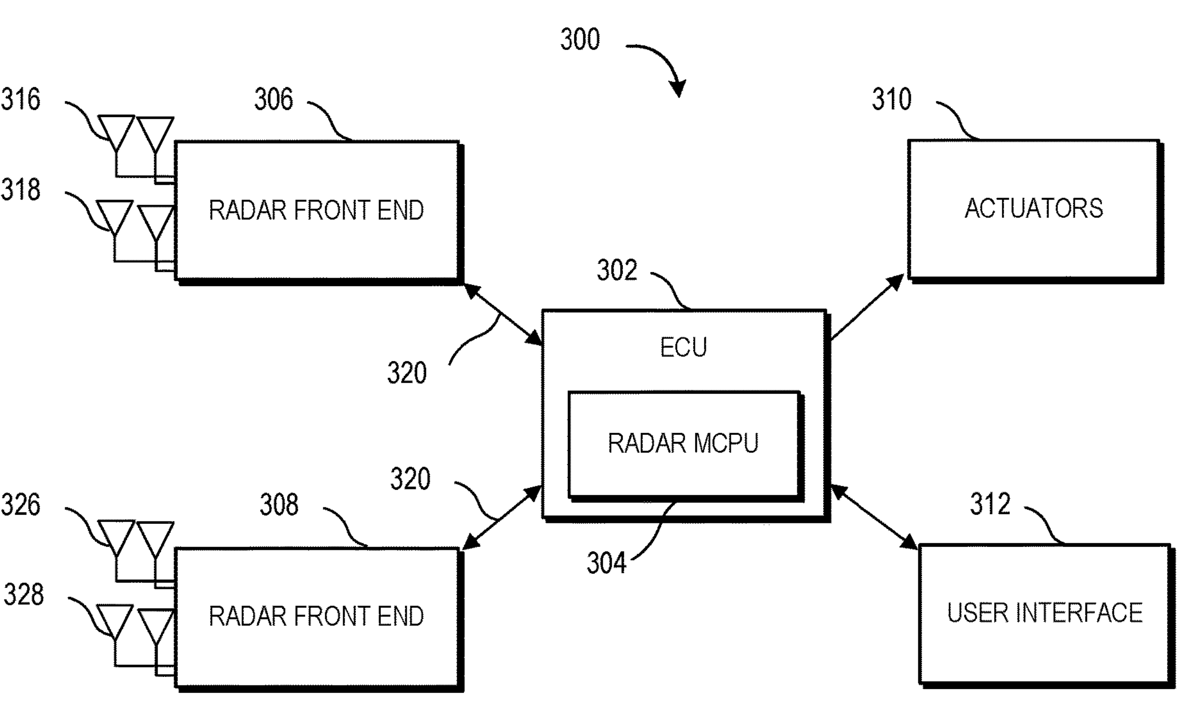
FIG. 3 shows an example of a vehicular control system including a radar system, such as the radar system of FIGS. 1 and 2, in accordance with various embodiments.

FIG. 3 shows an example of a vehicular control system 300 in accordance with some embodiments. The vehicular control system 300 is implemented, for example, in an automobile and may be used to assist in driver-assistance or autonomous driving functions. As illustrated, the vehicular control system 300 includes a radar system which includes radar front ends 306, 308 and a radar MCPU 304. In some embodiments, radar front ends 306, 308 correspond to radar front end 102 in FIG. 1 and radar MCPU 304 corresponds to radar MCPU 138 in FIG. 2.

In some embodiments, the vehicular control system 300 includes an electronic control unit (ECU) 302. The ECU 302 includes the radar MCPU 304 as well as other processing circuitry, e.g., a central processing unit (CPU), to perform various processing functions related to vehicular control. The radar MCPU 304 is coupled to radar front ends 306, 308 via interfaces 320. While two radar front ends 306, 308, are shown in FIG. 3, this number is for clarity purposes and may be scalable to a larger quantity. In some embodiments, the radar front ends 306, 308 are located at various positions around an automobile housing vehicular control system 300. For example, one radar front end 306 is positioned at the front end of the automobile and the other radar front end 308 is positioned at the rear end of the automobile. In some embodiments, radar front end 306 includes a plurality of antennas 316, 318. For example, plurality of antennas 316 are transmission antennas and plurality of antennas 318 are reception antennas. Similarly, in some embodiments for radar front end 308, the plurality of antennas 326 are transmission antennas and the plurality of antennas 328 are reception antennas. In some embodiments, the plurality of antennas associated with each of radar front ends 306, 308 support MIMO radar configurations. While two antennas are shown for each of the plurality of antennas 316, 318, 326, 328, this number is for clarity purposes and may be scalable to larger quantities (e.g., three, four, or more antennas) in some embodiments.

In some embodiments, the radar MCPU 304 is implemented as a micro-controller unit (MCU) or other processing unit that is configured to execute radar signal processing tasks such as, but not limited to, object identification, computation of object distance, object velocity, and object direction (collectively referred to as "radar information"). In some embodiments, the radar MCPU 304 is additionally configured to generate control signals based on the radar information. The radar MCPU 304 is, for example, configured to generate calibration signals, receive data signals, receive sensor signals, generate frequency spectrum shaping signals (such as signals associated with the FCMW radar techniques described herein) and/or state machine signals for radio frequency (RF) circuit enablement sequences. In addition, in some embodiments, the radar MCPU 304 is configured to program the radar front ends 306, 308 to operate in a coordinated fashion by transmitting MIMO waveforms for use in constructing a virtual aperture from a combination of the distributed apertures formed by the plurality of transmission and reception antennas shown in FIG. 3.

The radar front ends 306, 308, in some embodiments, include radar front end chip circuitry that is coupled to the respective pluralities of antennas to transmit radar signals (e.g., in the form of radar chirp sequences), to receive reflected radar signals, and to digitize these received radar signals for forwarding to the radar MCPU 304 over interface 320. In some embodiments, the radar MCPU 304 performs radar processing tasks based on the digitized radar signals received from the radar front ends 306, 308 to provide radar information to the ECU 302. The ECU 302 uses this radar information to control one or more actuators 310 such as a steering actuator, braking actuator, or throttle actuator to assist in driver-assistance or autonomous driving functions. In some embodiments, the ECU 302 displays the radar information or associated information via a user interface 312 such as a screen display, a speaker, or a light (e.g., in a side mirror or on a dashboard) to alert the driver of nearby objects.

Figure 4:
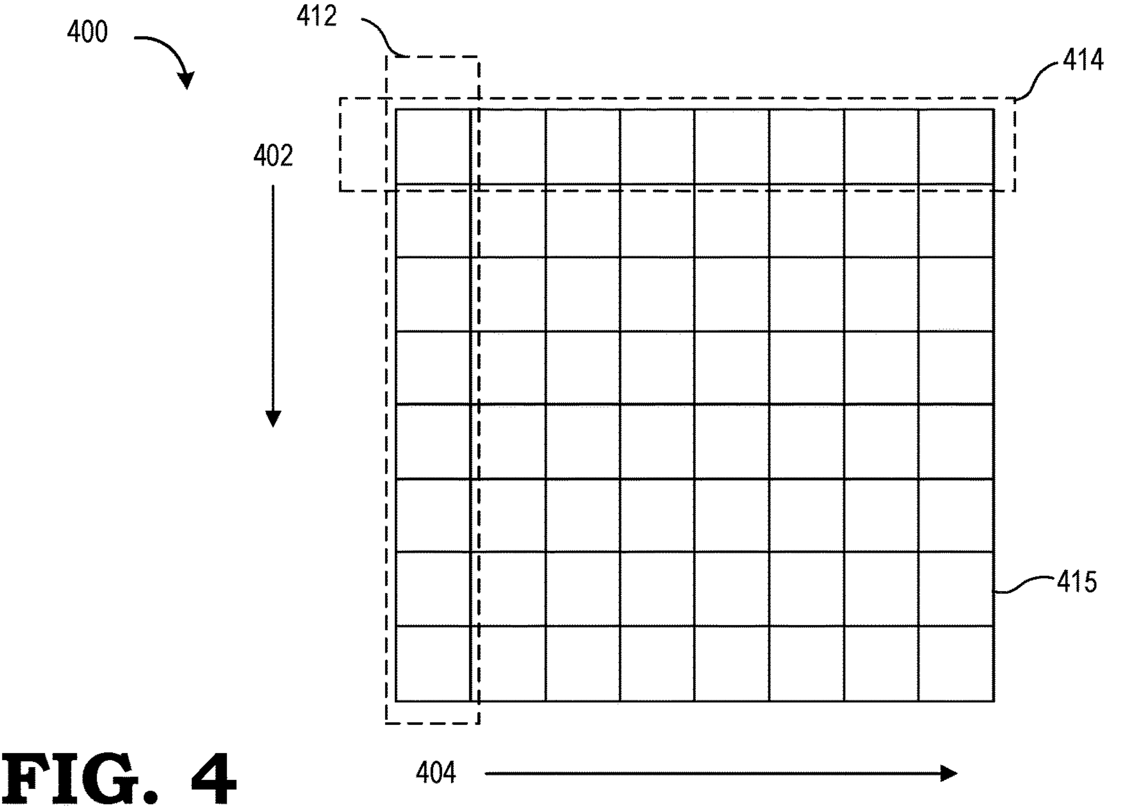
FIG. 4 shows an example of a matrix representing digitized samples of the received radar signal in the fast-time and the slow-time in accordance with various embodiments.

FIG. 4 illustrates an example of a matrix 400 representing digitized samples of the received radar signal in the fast-time 402 and the slow-time 404. For example, the matrix 400 represents the interference suppressed ADC samples 146 input into the fast-time spectrum component 148 of the RX processor 142 of FIG. 2 and includes samples 415 (one labeled for clarity) with dimensions in both the fast-time 402 and the slow-time 404.

The first FFT component in the RX processor, such as the fast-time spectrum component 148 of RX processor 142, processes the digitized samples represented by matrix 400 across the fast-time 402 by applying a first window 412 across each column of matrix 400 and then taking the FFT over fast-time 402 of the windowed samples. The second FFT component in the RX processor, such as the slow-time spectrum component 152 of RX processor 142, processes the digitized samples represented by matrix 400 across the slow-time by applying a second window 414 across each row of matrix 400 and then taking the FFT over the slow-time 404 of the windowed samples. In this manner, the matrix 400 is processed by the FFT processing components to output a corresponding range-Doppler matrix (also referred to as a range-velocity matrix) that is used to determine the range and velocities of the detected targets in the radar system's surrounding environment.

In accordance with some embodiments, each of the windows 412, 414 are implemented as a function that is zero-valued (or used to mitigate the values) outside of a selected interval. In some cases, the window includes a series of weighted coefficients that are symmetric about the selected of the interval of the series of weighted coefficients. For example, the window may be represented as a bell-shaped curve that approaches a maximum value at the middle and tapers away to lower (e.g., zero) values away from the middle. Mathematically, when a signal waveform or data sequence is "windowed," this means that the signal waveform or data sequence is multiplied by a window with weighted coefficient values that accentuates the part of the signal waveform or data sequence (e.g., row or column of matrix 400) that falls within the selected interval of the window and negating the signal waveform or data sequence values that fall outside of the "window" by zeroing or minimizing them. Since the second window 414 is applied across the slow-time 404 of matrix 400, it equally weighs samples 415 of a single range profile, which means that the second window 414 can be performed at the individual chirp level. The techniques described herein leverage this aspect to move a part of the second window 414 to the transmit side by modifying the transmit powers of the individually transmitted chirps of the plurality of chirps. That is, part of the effect of the second window 414 is implemented at the transmit side by lowering the transmit power of the chirps that fall outside of the range of chirps that are to be the focal point of the second window 414 prior to slow-time FFT processing. The overall effect in the output of the second window 414 applied prior to slow-time FFT processing remains unchanged, but by executing the techniques described herein, the transmit power of the chirps corresponding to the window samples having lower amplitudes is reduced. This results in an SNR gain (e.g., in the range of 1.5 dB to 2 dB, e.g., ~1.8 dB) if the overall transmit power budget to transmit the plurality of chirps in a radar chirp sequence is kept the same. Alternatively, the transmit power budget can be reduced while maintaining a similar signal quality (e.g., SNR) in the received radar signal.

Figure 5:
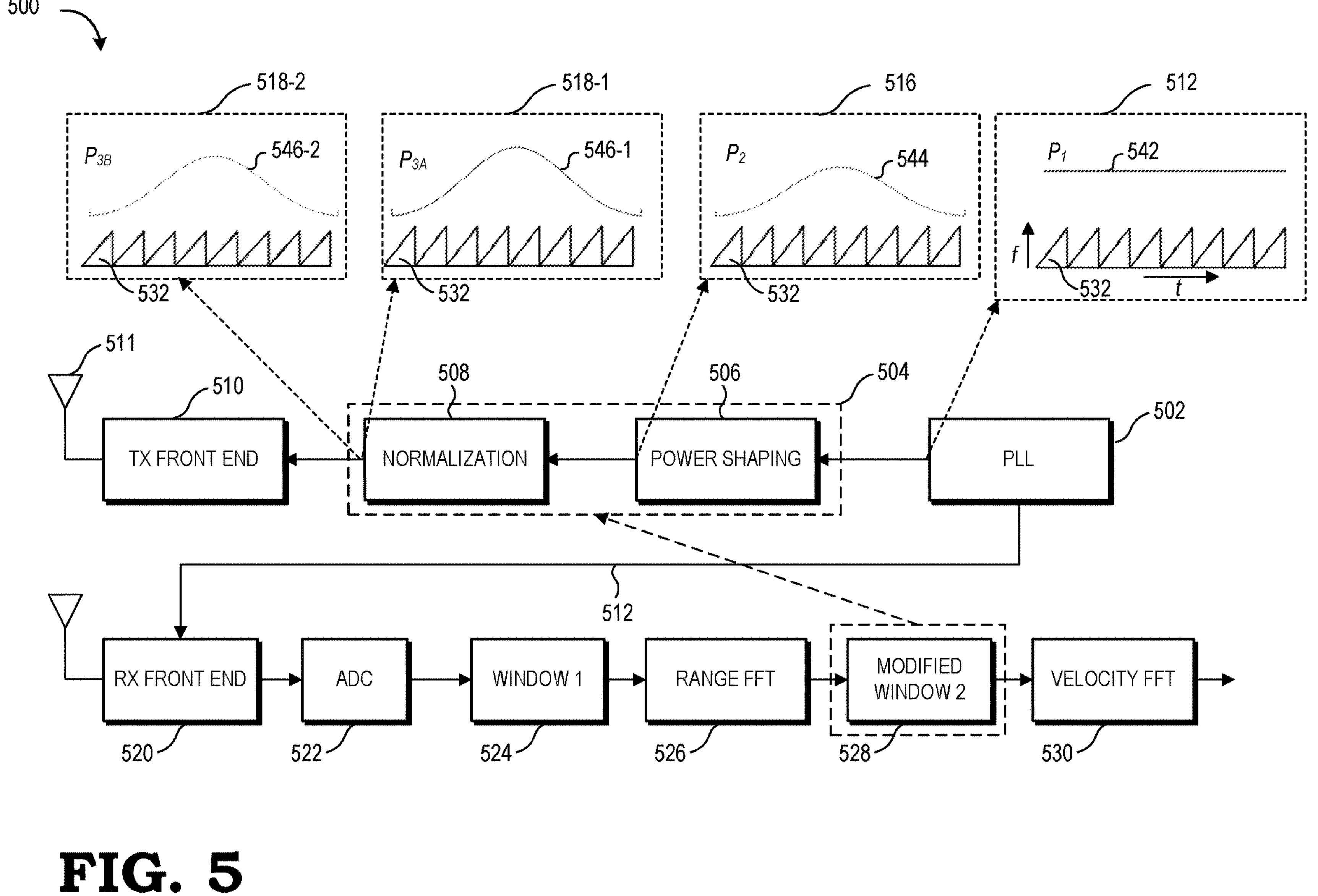
FIG. 5 shows an example of a radar system that shapes the transmit power of a radar signal according to a power profile based on a slow-time window applied by a radar signal processor in accordance with various embodiments.

FIG. 5 shows radar system 500 configured to shape the transmit power of a radar signal according to a power profile based on a slow-time window applied by a radar signal processor prior to slow-time processing. In some embodiments, the radar system 500 corresponds to radar system 100 of FIGS. 1 and 2 or the radar system of FIG. 3.

The transmit chain of the radar system 500 includes phase locked loop (PLL) circuitry 502 to generate a radar transmit signal including a sequence of radar transmit signals such as radar chirps 532 (one chirp labeled for clarity) and a TX front end 510 coupled to one or more transmit antennas 511 that transmits the radar signal to the surrounding environment. For example, in some embodiments, the PLL circuitry 502 generates a linear frequency modulated signal such as an FMCW signal with a plurality of frequency modulated chirps. The sequence of chirps includes multiple chirps 532 that increase (i.e., ramp up) in frequency, f, over the duration, t, of each corresponding chirp as shown in box 512. In addition, at the output of the PLL 502 illustrated in box 512, the sequence of chirps 532 is generated at a constant power profile ($P_1$) 542. Different from conventional systems that would then amplify the constant power of the sequence of chirps to a higher constant power prior to transmission, radar system 500 includes additional transmit signal components 504 that modify the power profile of the sequence of chirps in the radar signal to be transmitted by the TX front end 510. In the illustrated embodiment, the radar transmit signal sequence including the plurality of radar transmit signals is described as a radar chirp sequence including a plurality of radar chirps. In other embodiments, the radar transmit signal sequence is a pulse-based radar sequence or a digitally modulated radar sequence including a plurality of radar pulses or a plurality of digitally modulated radar symbols, respectively.

The additional transmit signal components 504 includes hardware, software, or a combination thereof that takes the constant power profile $P_1$ 512 of the sequence of chirps 532 generated by the PLL circuitry 502 and transforms the power profile to a modified power profile including a plurality of different power levels. In some embodiments, this modified power profile is based on applying a portion of the second window that is generally applied during the slow-time signal processing of the received radar signal at the transmitter prior to signal transmission. That is, as opposed to conventional systems that apply second window across the slow-time only during signal processing of the received radar signal, radar system 500 applies part of this window at the additional transmit signal components 504 at power shaping component 506 prior to transmitting the radar signal. For example, half of the weighted coefficient values typically applied by the second window are applied at the power shaping component 506 and the other half of the weighted coefficient values are applied (i.e., remain) at the signal processing components in the receive chain, e.g., at Modified Window 2 528. Thus, the power shaping component 506 is configured to adjust the constant power profile $P_1$ 542 generated by the PLL 502 to a modified power profile $P_2$ 544 at its output 516. The power shaping component 506 thus outputs the sequence of chirps 534 at the modified power profile $P_2$ 544. In some embodiments, the modified power profile $P_2$ 544 follows the square root of the weighted coefficients of the second window applied over the slow-time.

In some embodiments, the additional transmit signal components 504 include a normalization component 508 to increase the power levels of the modified power profile $P_2$ 544. For example, the normalization component 508 multiplies the modified power profile $P_2$ 544 by a normalization factor to increase the modified power profile $P_2$ 544 to an output that is based on one of two options shown in outputs 518-1, 518-2. In the first option 518-1, the normalization component 508 multiplies the power of the power profile $P_2$ 544 by a first normalization factor to output power profile $P_{3A}$ 546-1. Power profile $P_{3A}$ 546-1 has the same average output power as the constant power profile $P_1$ 542. That is, the area under the power profile $P_{3A}$ 546-1 and the area under the constant power profile $P_1$ 542 is the same (or substantially the same). In this manner, the total transmission power budget to transmit the radar signal is maintained, but the SNR in the received signal is increased due to the change in how the noise and the signal experience the effects of the second window (i.e., the window applied over the slow-time). In the second option 518-2, the normalization component 508 multiplies the power of the power profile $P_2$ 544 by a second normalization factor to output power profile $P_{3B}$ 546-2. Power profile $P_{3B}$ 546-2 corresponds to the power profile to achieve the same SNR output as would be achieved by transmitting the sequence of radar chirps at a constant, high-power level as per conventional techniques, but does so at a lower overall transmission power budget. Thus, the techniques described herein are able to achieve a higher SNR at the same transmission power budget to transmit the sequence of radar chirps (shown in option 1, 518-1) or a same SNR at a lower transmission power budget to transmit the sequence of radar chirps (shown in option 2, 518-2).

The radar system 500 also includes a receive chain including RX front end 520, ADC 522, Window 1 524, Range FFT 526, Modified Window 2 528, and Velocity FFT 530. RX front end 520 includes the components of the receiver 110 of FIG. 1 up to the ADC 122. In some embodiments, RX front end 520 includes a low noise amplifier such as LNA 112, a mixer such as mixer 114 to receive signal 512 from PLL circuitry 502, a high-pass filter such as HPF 116, a power amplifier such as PA 118, and a low-pass filter such as LPF 120. In some embodiments, ADC 522 corresponds to ADC 122 of FIG. 1 and outputs digitized samples of the radar signal received by the RX front end 520. The receive chain also includes Window 1 524 and Range FFT 526 as well as Modified Window 2 528 and Velocity FFT 530. In some embodiments, Window 1 524 and Range FFT 526 are implemented, for example, at the Fast-time (Range) spectrum component 148 shown in FIG. 2, and Modified Window 2 528 and Velocity FFT 530 are implemented, for example, at the Slow-time (Doppler) spectrum component 152 shown in FIG. 2.

The second window (i.e., the window applied to the slow-time of the digitized samples) that is conventionally only applied in the receive chain is split into two portions according to the techniques described herein. A first of these portions is moved to the power shaping component 506 to modify the power profile of the sequence of chirps to be transmitted by the radar system 500, while the second of these portions remains in its position at Modified Window 2 528 prior to Velocity FFT 530 processing (also referred to as Slow-time velocity processing, Slow-time Doppler processing, second FFT processing, or the like). For example, in some embodiments, the part of the second window moved to the power shaping component 506 is the square root of the values of the second window, while the remaining square root of the values of the second window remains at Modified Window 2 528.

In some embodiments, the second window is defined by the radar system's requirements. For example, the second window can be defined by considerations attributed to the radar system's use in ADAS or AD vehicular application. Thus, in some aspects, the cascading of the second window between the transmitter and signal processing at the RX processor (i.e., the splitting of the second window between the power shaping component 606 and the Modified Window 2 528 of FIG. 5) should be the same as if the second window was applied entirely during the signal processing at the RX processor. In some aspects, this includes splitting the second window equally between the transmitter (e.g., at power shaping component 508 of FIG. 5) and the signal processor (e.g., at Modified Window 2 528 of FIG. 5). For example, referring to FIG. 5 for illustrative purposes, since the second window is applied to a signal by multiplying the signal by the weighted coefficients of the second window, this equal splitting results in the power shaping component 508 applying a square root of the weighted coefficients of the second window to its input to generate a modified power profile at its output, and the Modified Window 2 528 applying the square root of the weighted coefficients of the second window to its corresponding input to generate the windowed samples for Velocity FFT processing. At the same average transmit power (i.e., once the normalization component 508 applies the first normalization factor according to the option at output 518-1), in some embodiments, this results in an SNR gain of ~1.8 dB. Alternatively, at the same SNR at the receiver side (i.e., once the normalization component 508 applies the second normalization factor according to the option at output 518-2), in some embodiments, this results in a ~1.8 dB reduction in the transmit power.

Figure 6:
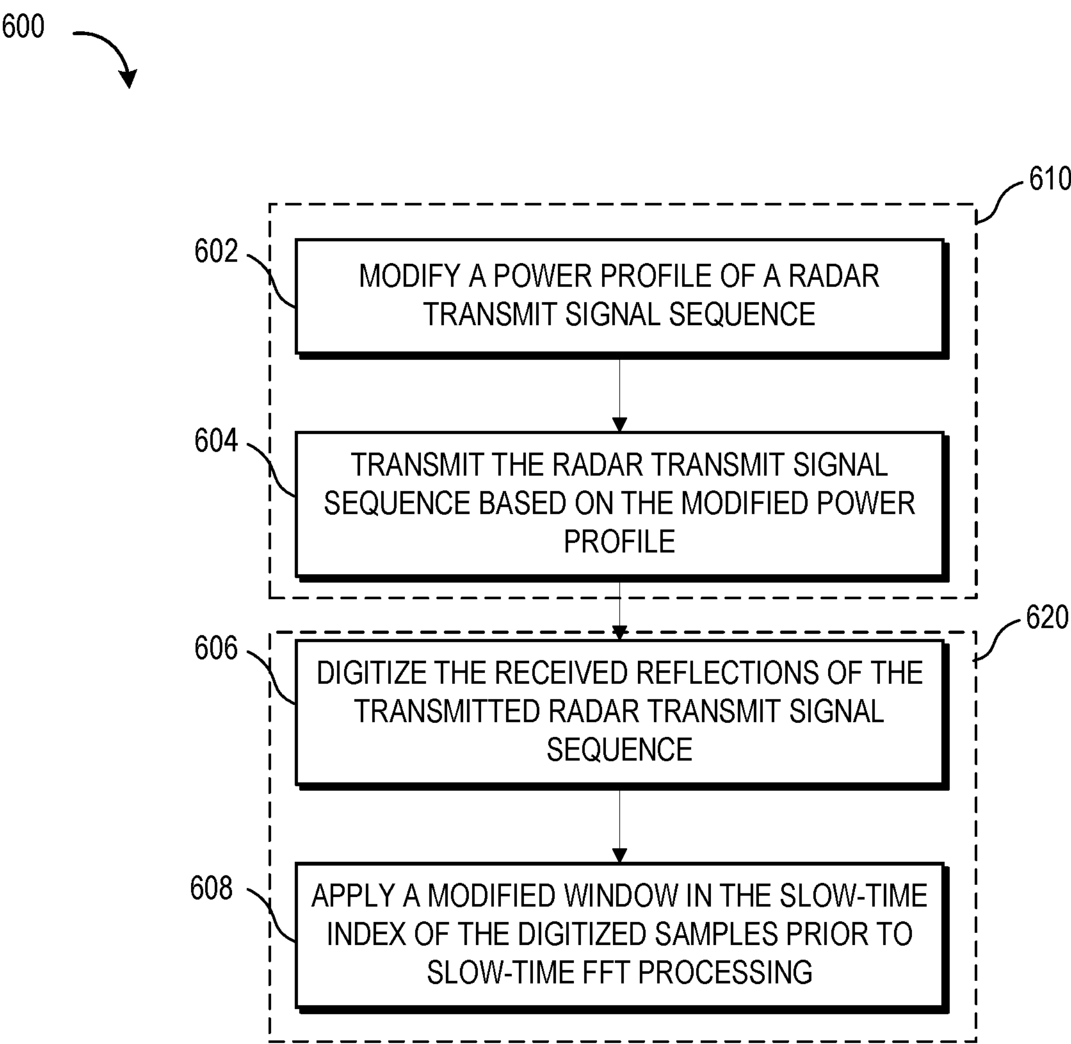
FIG. 6 shows an example of a method flowchart for transmit power shaping and signal processing techniques in accordance with various embodiments.

FIG. 6 shows an example of a flowchart 600 detailing the transmit power shaping and signal processing techniques according to some embodiments. Flowchart 600 includes a first section 610 that is implemented by transmission components (e.g., power shaping component 506, normalization component 508, and TX front end component 510 of FIG. 5) of a radar device and a second section 620 that is implemented by reception components (e.g., an RX front end 520 and ADC 522 of FIG. 5) and signal processing components (e.g., Window 1 524, Range FFT 526, Modified Window 2 528, and Velocity FFT 530 of FIG. 5) of the radar device.

At 602, the transmitter modifies the power profile of a radar transmit signal sequence prior to transmission. For example, referring to FIG. 5, the radar chirp sequence is generated by PLL circuitry 512 at a constant power profile $P_1$ 542. The power shaping component 506 modifies the constant power profile $P_1$ 542 to modified power profile $P_2$ 544. In some embodiments, the modified power profile $P_2$ 544 is associated with a window applied by a signal processor to the slow-time of digitized samples of the received reflections of the plurality of radar chirps. In addition, in some embodiments, the radar chirp sequence with the modified power profile $P_2$ 544 is further processed by a normalization component 508 to increase the power levels in the power profile.

At 604, the transmitter transmits a radar signal including the radar transmit signal sequence based on the modified power profile. For example, the transmitter includes a multi-stage power amplifier such as PA 106 that transmits the radar transmit signal sequence at a plurality of discrete power levels based on the modified power profile. For example, the multi-stage power amplifier includes 2 to 10 different power gain settings that transmit the plurality of chirps in the radar chirp sequences at a corresponding number of different power levels.

At 606, the receiver digitizes the received reflections of the radar transmit signal sequence in the transmitted radar signal. For example, this includes an ADC such as ADC 122 of FIG. 1 or ADC 522 of FIG. 5 converting the received signal from an analog signal to a plurality of discrete, digitized samples.

At 608, after applying first window and a first FFT to the digitized samples to generate a range profile of the received reflections, a signal processor (such as RX processor 142 of FIG. 2) applies a modified window in the slow-time (e.g., via Modified Window 2 528 of FIG. 5). In some embodiments, the modified window in the slow-time is associated with the modified power profile applied by the transmitter at step 602. In some embodiments, in cases where a multi-stage power amplifier is used in the transmitter, the modified window in the slow-time is matched to the number of power gain settings of the multi-stage power amplifier. After applying the modified window in the slow-time, the signal processor performs slow-time FFT processing to generate a range-velocity profile of the received reflections.

In a first embodiment, a radar front end includes a transmit signal generation circuitry, a power shaping component, and a transmitter. The transmit signal generation circuitry is configured to generate a radar transmit signal sequence including a plurality of radar transmit signals. The power shaping component is configured to receive the plurality of radar transmit signals of the radar transmit signal sequence and output the plurality of radar transmit signals with a plurality of different power levels. The transmitter is configured to transmit the plurality of radar transmit signals of the radar transmit signal sequence based on the plurality of different power levels.

In some aspects of the first embodiment, the plurality of different power levels corresponds to a power profile associated with a window applied to digitized samples of received reflections of the transmitted plurality of radar transmit signals at a radar processor coupled to the radar front end. In some aspects, the window is applied in a slow-time domain of the digitized samples. In some aspects, the power profile corresponds to a square root of weighted coefficient values of the window if the window was only applied at the radar processor. In some aspects, the radar processor applies the window prior to a velocity fast Fourier transform (FFT) processing. In some aspects, the radar processor performs a range FFT processing on the digitized samples across a fast-time domain to estimate a range profile based on the digitized samples of the received reflections prior to applying the window. In some aspects, the radar processor applies a first window in the fast-time domain prior to the range FFT.

In some aspects of the first embodiment, the transmitter includes a power amplifier to receive the output from the power shaping component and convert the output into a signal including the plurality of radar transmit signals at a plurality of different amplified power levels prior to transmission.

In some aspects of the first embodiment, the transmit signal generation circuitry generates the radar transmit signal sequence including the plurality of radar transmit signals at an initial power profile including a constant power level, and the power shaping component modifies the initial power profile into the plurality of different power levels. In some aspects, the transmitter includes a normalization component to further modify the output of the power shaping component such that a total transmission power budget to transmit the plurality of radar transmit signals is substantially the same as if the plurality of radar transmit signals were transmitted at a constant power level. In some aspects, the plurality of different power levels is determined based on a power profile associated with a window applied to digitized samples of reflections of the transmitted plurality of radar transmit signals prior to slow-time velocity processing.

In a second embodiment, a radar device includes a radar front end and a radar processor. The radar front end includes transmit signal generation circuitry to generate a radar transmit signal sequence including a plurality of radar transmit signals and a power shaping component configured to receive the plurality of radar transmit signals and output the plurality of radar transmit signals with a plurality of different power levels. The radar front end includes a transmitter to transmit the plurality of radar transmit signals based on the plurality of different power levels, where the plurality of different power levels is based on a power profile associated with a window applied to digitized samples of reflections of the transmitted plurality of radar transmit signals. The radar processor is configured to apply the window across a slow-time of the digitized samples of the reflections prior to velocity processing.

In some aspects of the second embodiment, the radar front end includes a receiver to receive the reflections of the transmitted plurality of radar transmit signals, the receiver including an analog-to-digital converter (ADC) to convert the reflections to the digitized samples.

In some aspects of the second embodiment, the power profile corresponds to a square root of weighted coefficient values of the window if the window was only applied at the radar processor.

In some aspects of the second embodiment, the transmitter includes a power amplifier to receive the output from the power shaping component and convert the output into a signal including the plurality of radar transmit signals at a plurality of different amplified power levels prior to transmission.

In some aspects of the second embodiment, the transmit signal generation circuitry generates the radar transmit signal sequence including the plurality of radar transmit signals at an initial power profile including a constant power level, and the power shaping component modifies the initial power profile into the plurality of different power levels based on the power profile.

In a third embodiment, a method includes generating a plurality of radar transmit signals at a constant power level and modifying the constant power level of the plurality of radar transmit signals to a plurality of power levels according to a power profile. The method further includes transmitting the plurality of radar transmit signals based on the plurality of power levels.

In some aspects of the third embodiment, the method includes receiving reflections of the plurality of radar transmit signals, converting the received reflections to digitized samples, applying a first window across a fast time of the digitized samples, performing first fast Fourier transform (FFT) processing of the digitized samples to generate a range spectrum, applying a second window across a slow-time of the range spectrum, and performing second FFT processing of the range spectrum to generate a range-velocity spectrum. In some aspects of the third embodiment, the power profile is associated with the second window. In some aspects of the third embodiment, the power profile corresponds to a square root of weighted coefficient values of the second window if the second window was only applied after performing first FFT processing and prior to performing second FFT processing.

In some aspects of the third embodiment, the method includes modifying the power profile based on maintaining an average output power of the transmitted plurality of radar transmit signals substantially the same as if the plurality of radar transmit signals were transmitted at a constant power.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A radar front end comprising:

transmit signal generation circuitry configured to generate a radar transmit signal sequence comprising a plurality of radar transmit signals;

a power shaping component configured to receive the plurality of radar transmit signals of the radar transmit signal sequence and output the plurality of radar transmit signals with a plurality of different power levels; and a transmitter to transmit the plurality of radar transmit signals of the radar transmit signal sequence based on the plurality of different power levels, the transmitter comprising a power amplifier to receive the output from the power shaping component, and convert the output into a signal including the plurality of radar transmit signals at a plurality of different amplified power levels prior to transmission.

2. The radar front end of claim 1, wherein the plurality of different power levels corresponds to a power profile associated with a window applied to digitized samples of received reflections of the transmitted plurality of radar transmit signals at a radar processor coupled to the radar front end.

3. The radar front end of claim 2, wherein the window is applied in a slow-time domain of the digitized samples.

4. The radar front end of claim 3, wherein the power profile corresponds to a square root of weighted coefficient values of the window if the window was only applied at the radar processor.

5. The radar front end of claim 3, wherein the radar processor applies the window prior to a velocity fast Fourier transform (FFT) processing.

6. The radar front end of claim 5, wherein the radar processor performs a range FFT processing on the digitized samples across a fast-time domain to estimate a range profile based on the digitized samples of the received reflections prior to applying the window.

7. The radar front end of claim 6, wherein the radar processor applies a first window in the fast-time domain prior to the range FFT.

8. The radar front end of claim 1, wherein the transmit signal generation circuitry generates the radar transmit signal sequence comprising the plurality of radar transmit signals at an initial power profile comprising a constant power level, and the power shaping component modifies the initial power profile into the plurality of different power levels.

9. The radar front end of claim 8, wherein the transmitter comprises a normalization component to further modify the output of the power shaping component such that a total transmission power budget to transmit the plurality of radar transmit signals is substantially the same as if the plurality of radar transmit signals were transmitted at a constant power level.

10. The radar front end of claim 8, wherein the plurality of different power levels is determined based on a power profile associated with a window applied to digitized samples of reflections of the transmitted plurality of radar transmit signals prior to slow-time velocity processing.

11. The radar front end of claim 8, wherein the transmitter comprises a normalization component to further modify the output of the power shaping component such that a signal-to-noise ratio of the plurality of radar transmit signals is substantially the same as if the plurality of radar transmit signals were transmitted at a constant power level.

12. A radar device comprising:

a radar front end comprising:

transmit signal generation circuitry configured to generate a radar transmit signal sequence comprising a plurality of radar transmit signals;

a power shaping component configured to receive the plurality of radar transmit signals of the radar transmit signal sequence and output the plurality of radar transmit signals with a plurality of different power levels; and a transmitter to transmit the plurality of radar transmit signals based on the plurality of different power levels, wherein the plurality of different power levels is based on a power profile associated with a window applied to digitized samples of reflections of the transmitted plurality of radar transmit signals; and a radar processor to apply the window across a slow-time of the digitized samples of the reflections prior to velocity fast Fourier transform (FFT) processing of the digitized samples of the reflections;

wherein the power profile corresponds to a square root of weighted coefficient values of the window if the window was only applied at the radar processor.

13. The radar device of claim 12, the radar front end comprising:

a receiver to receive the reflections of the transmitted plurality of radar transmit signals, the receiver comprising an analog-to-digital converter (ADC) to convert the reflections to the digitized samples.

14. The radar device of claim 12, the transmitter comprising a power amplifier to receive the output from the power shaping component, and convert the output into a signal including the plurality of radar transmit signals at a plurality of different amplified power levels prior to transmission.

15. The radar device of claim 12, wherein the transmit signal generation circuitry generates the radar transmit signal sequence comprising the plurality of radar transmit signals at an initial power profile comprising a constant power level, and the power shaping component modifies the initial power profile into the plurality of different power levels based on the power profile.

16. A method comprising:

generating a plurality of radar transmit signals at a constant power level;

modifying the constant power level of the plurality of radar transmit signals to a plurality of power levels according to a power profile to produce a plurality of modified radar signals, the power profile including a subset of weighted coefficient values of a second window applied by signal processing components of a receive chain that applies a first window and the second window;

normalizing the plurality of modified radar signals to have one of a first power output or a second power output, wherein the first power output has an average power level that matches an average power output of the plurality of transmit signals at the constant power level, wherein the second power output produces a signal-to-noise ratio (SNR) that matches an SNR of the plurality of transmit signals at the constant power level; and transmitting the plurality of modified radar transmit signals based on the plurality of power levels.

17. The method of claim 16, further comprising:

receiving reflections of the plurality of modified radar transmit signals;

converting the received reflections to digitized samples;

applying the first window across a fast time of the digitized samples;

performing first fast Fourier transform (FFT) processing of the digitized samples to generate a range spectrum;

applying a second subset of the weighted coefficient values of the second window across a slow-time of the range spectrum; and performing second FFT processing of the range spectrum to generate a range-velocity spectrum.

18. The method of claim 17, wherein the power profile is associated with the second window.

19. The method of claim 18, wherein the power profile corresponds to a square root of weighted coefficient values of the second window if the second window was only applied after performing first FFT processing and prior to performing second FFT processing.

* * * * *